United States Patent
Chen et al.

(10) Patent No.: US 8,018,210 B2
(45) Date of Patent: Sep. 13, 2011

(54) VOLTAGE CONVERTING CIRCUIT AND METHOD THEREOF

(75) Inventors: Ke-Horng Chen, Taipei County (TW); Shih-Jung Wang, Taipei (TW); Yu-Huei Lee, Taipei County (TW); Yung-Chih Lai, Miaoli County (TW); Hsuan-Yu Tsai, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 78 days.

(21) Appl. No.: 12/696,023

(22) Filed: Jan. 28, 2010

(65) Prior Publication Data
US 2011/0127980 A1  Jun. 2, 2011

(30) Foreign Application Priority Data
Dec. 1, 2009  (TW) .............................. 98141035 A

(51) Int. Cl.
G05F 1/613 (2006.01)
G05F 1/00 (2006.01)
(52) U.S. Cl. ......................... 323/224; 323/288; 323/283
(58) Field of Classification Search .................. 323/224, 323/283, 288, 282
See application file for complete search history.

(56) References Cited

U.S. PATENT DOCUMENTS

| 6,009,000 A | 12/1999 | Siri |
| 6,933,706 B2 | 8/2005 | Shih |
| 7,498,793 B2 | 3/2009 | Xu |
| 7,570,032 B2 * | 8/2009 | Mariani et al. ................ 323/224 |

OTHER PUBLICATIONS

Yuan Yen Mai et al., "A Constant Frequency Output-Ripple-Voltage-Based Buck Converter without Using Large ESR Capacitor," IEEE Transactions on Circuits and Systems II, Express Briefs. vol. 55, No. 8, Aug. 2008, pp. 748-752.
Wang et al., "Quadratic Differential and Integration Technique in V2 Control Buck Converter with Small ESR Capacitor," IEEE 2009 CICC, pp. 211-214, Sep. 13-16, 2009.
Lee et al., "Quadratic Differential and Integration Technique in V2 Control Buck Converter with Small ESR Capacitor," Power Electronics, IEEE 2009.

* cited by examiner

*Primary Examiner* — Shawn Riley
(74) *Attorney, Agent, or Firm* — Jianq Chyun IP Office

(57) ABSTRACT

A voltage converting circuit including a power stage, a filter, a comparator, a first and a second feedback units. The power stage receives an input voltage and outputs the input voltage according to a duty cycle. The filter receives the input voltage to convert the input voltage into a current, and filters the current to obtain an output voltage. The first feedback unit amplifies a difference between a reference voltage and the output voltage to obtain an error voltage. The second feedback unit calculates the quadratic differential and integration of the output voltage to obtain a sensing voltage. The comparator compares the error voltage and the sensing voltage, and outputs a comparing result to adjust a duty ratio. Herein, a ripple of the output voltage is linearly proportional to that of the current, and DC divided voltage level of the output voltage is substantially equal to the reference voltage.

31 Claims, 13 Drawing Sheets

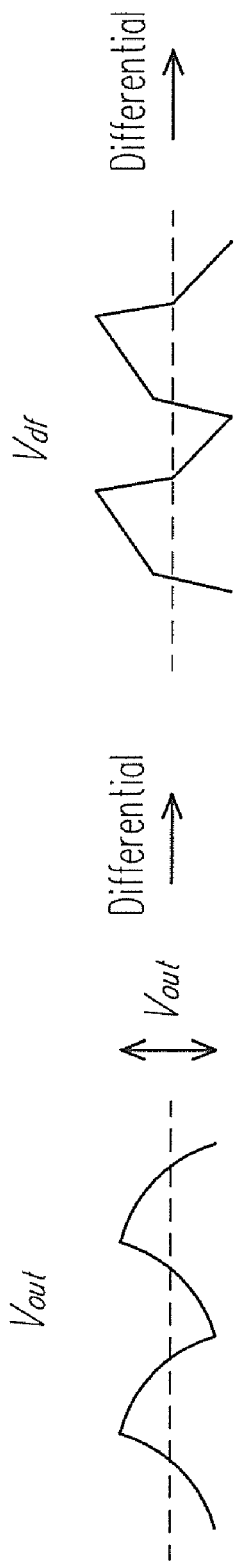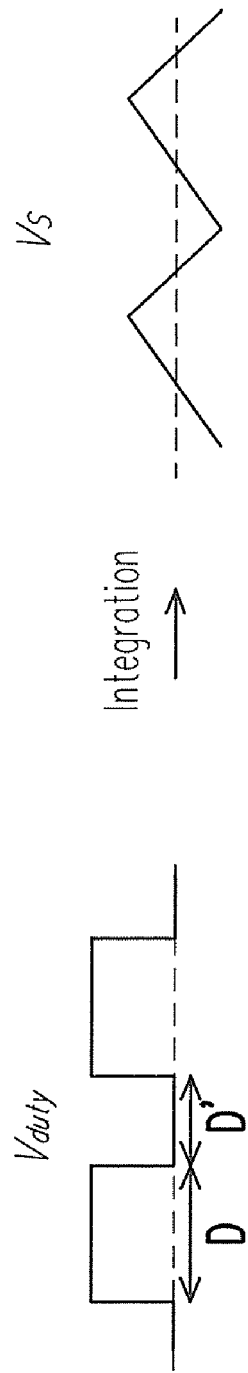
FIG. 4A  FIG. 4B  FIG. 4C  FIG. 4D

VOLTAGE CONVERTING CIRCUIT AND METHOD THEREOF

CROSS-REFERENCE TO RELATED APPLICATION

This application claims the priority benefit of Taiwan application serial no. 98141035, filed on Dec. 1, 2009. The entirety of the above-mentioned patent application is hereby incorporated by reference herein and made a part of specification.

BACKGROUND OF THE INVENTION

1. Technical Field

The present invention relates to a voltage converting circuit and a method thereof.

2. Background

Today, people increasingly depend on electronic products. To meet requirements of high speed, high performance, and features of lightness, slimness, shortness and smallness, various portable electronic products, such as notebook computers, cell phones, personal digital assistants (PDA) become more and more popular. Therefore, works can be handled at any time, anywhere, and are no longer limited to be handled in the office.

However, to cope with a demand of fast data processing, power consumptions of the aforementioned portable electronic devices powered by batteries are accordingly increased during the data processing. Namely, since a higher data processing speed results in higher power consumption, to effectively maintain a battery operation time is an important issue. Here, based on dynamic voltage supplying and load current scaling, an effective method for maintaining the battery operation time can be provided for active and standby power management.

Therefore, when the system is converted from a deep sleep mode to an active mode, a direct current (DC)-DC voltage converter thereof must be able to quickly supply power and switch a load current, and vice versa. Therefore, in an electronic device system, utilization of a high efficiency DC-DC voltage converter having a fast dynamic response for reference tracking and load transient is necessary. For example, in the electronic device system, a $V^2$ control buck converter is used to provide the required voltages, so as to satisfy the aforementioned demand.

However, in the conventional $V^2$ control buck converter, a load capacitor of a large equivalent series resistance (ESR) is required, so as to satisfy the above demand, which may result in a higher ripple of an output voltage thereof.

SUMMARY

A voltage converting circuit and a method thereof have a feature of a low output voltage ripple without using an output capacitor with large equivalent series resistance (ESR), and meanwhile maintain a feature of fast transient response of a $V^2$ control buck converter.

In one of exemplary embodiment, a voltage converting circuit includes a power stage, a filter, a first feedback unit, a second feedback unit, and a comparator. The power stage receives an input voltage and outputs the input voltage according to a duty cycle in internal of the power stage. The filter receives the input voltage output from the power stage to convert the input voltage into a current, and filters the current to obtain an output voltage. The first feedback unit receives a reference voltage and the output voltage, and amplifies a difference between the reference voltage and the output voltage to obtain an error voltage. The second feedback unit receives the output voltage, and performs a quadratic differential operation and an integration operation to the output voltage to obtain a sensing voltage. The comparator compares the error voltage and the sensing voltage, and outputs a comparing result to the power stage, so as to adjust a duty ratio of the duty cycle. Herein, a ripple of the output voltage is linearly proportional to a ripple of the current, and a direct current (DC) divided voltage level of the output voltage is substantially equal to the reference voltage.

In one of exemplary embodiment, a voltage conversion method adapted to a voltage converting circuit is illustrated as followed. The input voltage is converted into an inductor current according to the duty cycle. The inductor current is filtered to obtain an output voltage. A difference between a reference voltage and the output voltage is amplified to obtain an error voltage. A quadratic differential operation and an integration operation are performed to the output voltage to obtain a sensing voltage. The error voltage and the sensing voltage are compared, so as to adjust a duty ratio of the duty cycle. Herein, a ripple of the output voltage is linearly proportional to a ripple of the current, and a DC divided voltage level of the output voltage is substantially equal to the reference voltage.

In one of exemplary embodiment, a voltage converting circuit includes a power stage, a filter, a first feedback unit, a second feedback unit, and a comparator. The power stage receives an input voltage and outputs the input voltage according to a duty cycle in internal of the power stage. The filter receives the input voltage output from the power stage to convert the input voltage into a current, and filters the current to obtain an output voltage. The first feedback unit receives a reference voltage and the output voltage, and amplifies a difference between the reference voltage and the output voltage to obtain an error voltage. The second feedback unit receives the output voltage, and performs a differential operation to the output voltage to obtain a sensing voltage. Herein, the second feedback unit is a voltage control current source (VCCS). The comparator compares the error voltage and the sensing voltage, and outputs a comparing result to the power stage, so as to adjust a duty ratio of the duty cycle. Herein, a ripple of the output voltage is linearly proportional to a ripple of the current, and a DC divided voltage level of the output voltage is substantially equal to the reference voltage.

In one of exemplary embodiment, the voltage converting circuit may obtain the inductor current information through the ripple of the output voltage without using a large ESR. Therefore, the ripple of the output voltage is relatively small, and a feature of fast transient response is achieved, which can mitigate an overshoot and an undershoot phenomenon generated due to a load variation, and reduce a voltage recovery time. Moreover, with such circuit structure, the current ripple is less influenced by the ESR of a load capacitor, so that the ripple of the output voltage can be reduced, and thus the output voltage can be more precise.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A-4D are waveform diagrams of various voltage signals generated when a voltage converting circuit of FIG. 3A uses a QDI to serve as a feedback unit.

DESCRIPTION OF THE EMBODIMENTS

Figure 1:
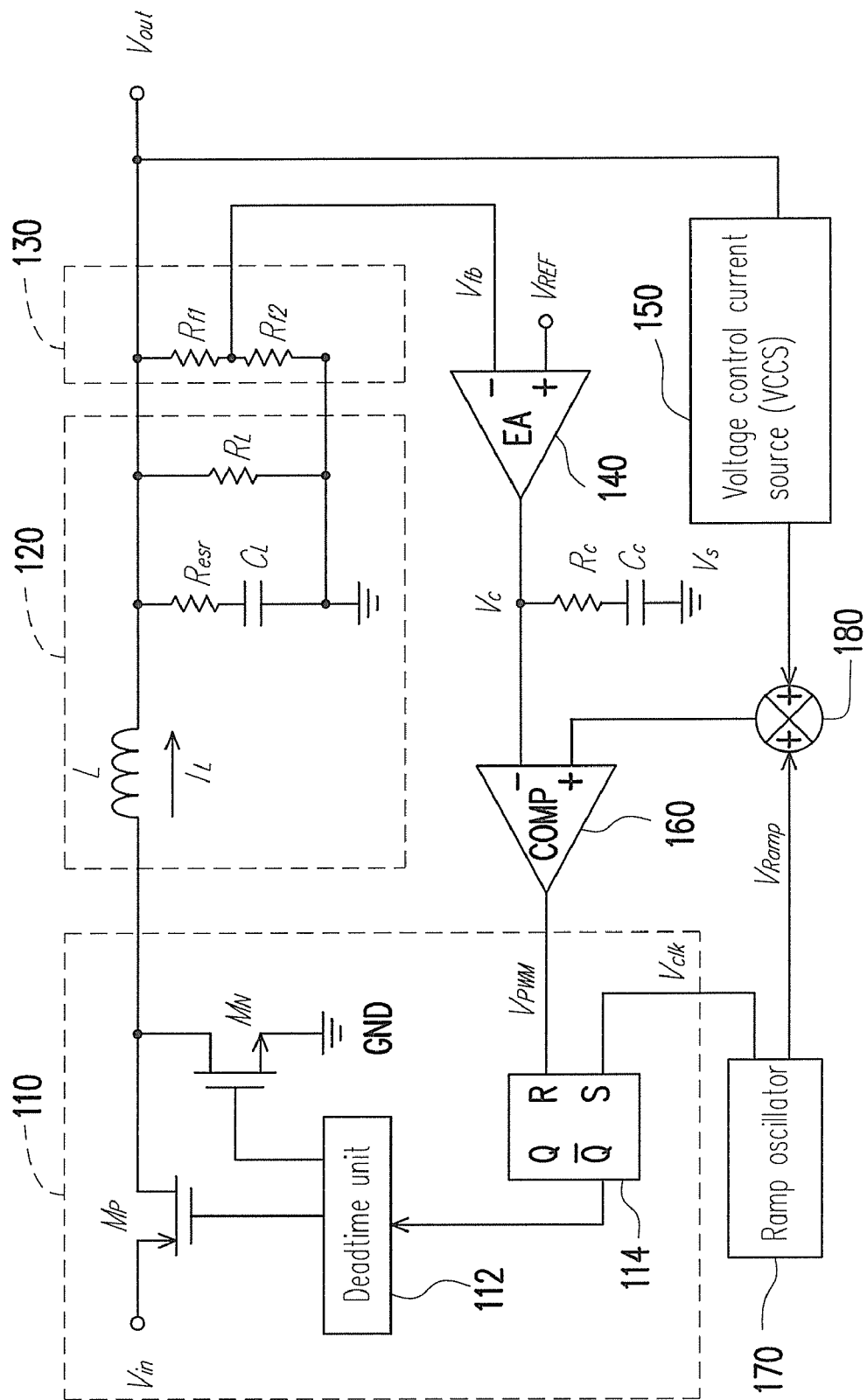
FIG. 1 is a schematic diagram illustrating a voltage converting circuit according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating a voltage converting circuit according to an exemplary embodiment. Referring to FIG. 1, the voltage converting circuit 100 is a current mode buck converting circuit, which includes a power stage 110, a filter 120, a voltage divider 130, a first feedback unit 140, a second feedback unit 150, a comparator 160 and a ramp oscillator 170.

Here, the second feedback unit 150 is, for example, a voltage control current source (VCCS), so that the voltage converting circuit may have a feature of low output voltage ripple without using a large equivalent series resistance (ESR), and meanwhile a feature of fast transient response of a $V^2$ control buck converter is maintained.

In detail, in the embodiment, the power stage 110 includes a deadtime unit 112, a logic unit 114, and switches $M_P$ and $M_N$. The deadtime unit 112 controls to turn on or turn off the switches $M_P$ and $M_N$ according to a duty cycle provided by the logic unit 114. When the switch $M_P$ is turned on, an input voltage $V_{in}$ is output to the filter 120, so that an inductor current $I_L$ is generated in the filter 120. Now, the switch $M_N$ is turned off, so as to avoid an inductor L in the filter 120 receiving a ground voltage GND. Conversely, when the switch $M_N$ is turned on, the deadtime unit 112 turns off the switch $M_P$, so that the inductor L receives the ground voltage GND.

Here, the switches $M_P$ and $M_N$ are respectively a P-type metal oxide semiconductor field-effect transistor (PMOSFET) and a N-type metal oxide semiconductor field-effect transistor (NMOSFET). Moreover, the logic unit 114 is, for example, a SR-type flip-flop, in which a set terminal receives a clock signal $V_{clk}$ provided by the ramp oscillator 170, and a reset terminal receives a comparing result output by the comparator 160, though the present disclosure is not limited thereto.

In the embodiment, the filter 120 is, for example, a low pass filter, which includes the inductor L, a load capacitor $C_L$ and a load resistor $R_L$, wherein the load capacitor $C_L$ and the load resistor $R_L$ are connected in parallel, and are coupled to the inductor L in series. It should be noticed that a resistor $R_{esr}$ is an equivalent series resistance (ESR) of the load capacitor $C_L$.

When the input voltage $V_{in}$ is output to the filter 120, the inductor current $I_L$ is generated in the inductor L. Then, the inductor current $I_L$ flows to the load capacitor $C_L$ to generate an output voltage $V_{out}$. Therefore, a ripple of the output voltage $V_{out}$ is linearly proportional to a ripple of the inductor current $I_L$. In the present embodiment, the output voltage $V_{out}$ is, for example, a pulse width modulation ramp signal, and a direct current (DC) divided voltage level thereof is substantially equal to a reference voltage $V_{ref}$. Here, the output voltage $V_{out}$ is formed by cross voltages of the load capacitor $C_L$ and the resistor $R_{esr}$, which can be represented by a following equation (1):

$$v_{out} = v_{esr} + v_{CL} = R_{esr}i_L + \frac{1}{C_L}\int i_L dt \qquad (1)$$

Where, $C_L$ represents a load capacitance, and $V_{CL}$ and $V_{esr}$ respectively represent the cross voltages of the load capacitor $C_L$ and the resistor $R_{esr}$.

According to the equation (1), it is known that the ripple of the output voltage $V_{out}$ relates to an integration of the inductor current $I_L$ and the ESR $R_{esr}$. Therefore, if the ripple of the output voltage is required to be reduced, another method has to be used to obtain the signal of the inductor current to replace the conventional large ESR.

In the present embodiment, using a current detecting circuit in the voltage converting circuit 100 is unnecessary, and a ripple of an output current generated when the inductor current $I_L$ flows through the resistor $R_{esr}$ of the load capacitor $C_L$ is used to serve as the signal of the inductor current, so as to generate a modulation cycle of the system. Therefore, when the load is transiently changed, a voltage change can be immediately reflected by the duty cycle through the first feedback unit 140 and the second feedback unit 150, so that the output voltage can be recovered to a normal level within a very short time.

In the present embodiment, the first feedback unit 140 is an error amplifier EA. An inverted terminal (−) of the error amplifier EA is coupled to the voltage divider 130 for receiving a voltage $V_{fb}$, and a non-inverted terminal (+) of the error amplifier EA receives the reference voltage $V_{ref}$. Therefore, the error amplifier EA amplifies a difference between the reference voltage $V_{ref}$ and the voltage $V_{fb}$ to obtain an error voltage $V_c$, and outputs the error voltage $V_c$ to the comparator 160 through an output terminal thereof. Moreover, the output terminal of the error amplifier EA is generally coupled to ground through an external resistance $R_C$ and a capacitor $C_C$ for frequency compensation.

Here, the voltage divider 130 includes resistors $R_{f1}$ and $R_{f2}$ for dividing the output voltage $V_{out}$, and outputting the divided output voltage $V_{fb}$ to the inverted terminal of the error amplifier EA.

In the embodiment, the second feedback unit 150 is the voltage control current source (VCCS), which serves as a differentiator. Therefore, the voltage control current source 150 receives the output voltage $V_{out}$, and performs a differential operation to the output voltage $V_{out}$ to obtain a sensing voltage $V_s$. Then, an adder 180 adds the sensing voltage $V_s$ and a ramp compensation voltage $V_{ramp}$ provided by the ramp oscillator 170. The adding result is output to the comparator 160.

Therefore, compared to a conventional $V^2$ control buck converter using a general differentiator, the voltage converting circuit 100 of the present embodiment uses the VCCS as the differentiator, so that the voltage converting circuit 100 can achieve a feature of low output voltage ripple without using a large ESR, and meanwhile maintain a feature of fast transient response of the $V^2$ control buck converter.

The ramp oscillator 170 provides the clock signal $V_{clk}$ to the set terminal S of the SR-type flip flop 114, and provides the ramp compensation voltage $V_{ramp}$ to the adder 180. Here, a sub-harmonic oscillation problem of the voltage converting circuit 100 can be avoided by adding the ramp compensation voltage $V_{ramp}$ and the sensing voltage V.

Then, the comparator 160 receives the error voltage $V_c$ and the sensing voltage $V_s$, and compares the two voltages to output a comparing result to the logic unit 114. In the present embodiment, the comparator 160 is, for example, a comparison amplifier COMP, in which an inverted terminal (−) receives the error voltage $V_c$, and a non-inverted terminal (+) receives the sensing voltage $V_s$. Here, an output terminal of the comparison amplifier COMP outputs a pulse width modulation voltage $V_{PWM}$ to the reset terminal R of the SR-type flip-flop 114, so as to adjust a duty ratio of the duty cycle.

Therefore, when the load is transiently changed, the voltage change can be immediately reflected by the duty cycle through a comparison of the reference voltage and the output voltage, so that the output voltage can be recovered to a normal level within a very short time. Namely, in the voltage converting circuit 100, the feature of fast transient response allows the system to quickly reach a stable state when the load is varied. In other words, in the present embodiment, the VCCS 150 serving as the differentiator transfers the ripple of the output voltage into the ripple of the inductor current, and in coordination with the ramp compensation voltage and the output of the error amplifier, the duty cycle of the system is defined, so as to stabilize the output voltage.

Figure 2:
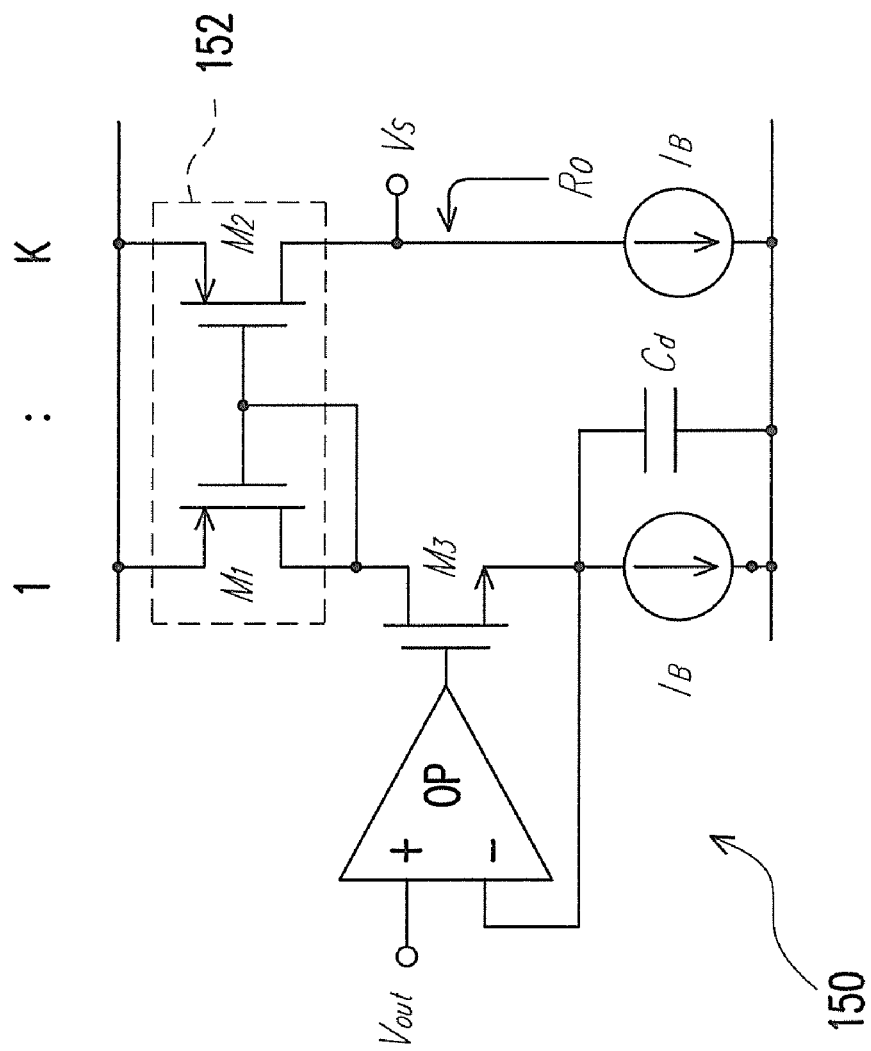
FIG. 2 is a circuit schematic diagram illustrating a voltage control current source (VCCS) according to an exemplary embodiment.

FIG. 2 is a circuit schematic diagram illustrating a voltage control current source according to an exemplary embodiment. Referring to FIG. 2, the VCCS 150 includes an operational amplifier OP, a current mirror 152, a capacitor $C_d$ and a switch $M_3$, wherein the current mirror 152 serves as a current source of the VCCS 150.

In the embodiment, a non-inverted terminal (+) of the operational amplifier OP receives the output voltage $V_{out}$, and an inverted terminal (−) of the operational amplifier OP is coupled to one terminal of the capacitor $C_d$, while another terminal of the capacitor $C_d$ is coupled to the ground voltage. Here, an output terminal of the operational amplifier OP is coupled a control terminal of the switch $M_3$ for turning on/off the switch $M_3$, so as to control the current mirror 152. In the embodiment, the switch $M_3$ is, for example, a NMOSFET. Certainly, the embodiment is not limited thereto.

In the embodiment, a transfer function of the VCCS 150 is represented by a following equation (2):

$$v_s(s) = s k C_d R_o v_{out}(s) \tag{2}$$

After the ripple of the output voltage is transferred, the ripple of the inductor current can be represented by a following equation (3):

$$\begin{aligned} v_s(t) &= k C_d R_o \left( R_{esr} \frac{di_L}{dt} + \frac{i_L}{C_L} \right) \\ &= R_{esr} k C_d R_o \frac{V_{in} - V_{out}}{L} + \frac{k C_d R_o}{C_L} i_L \end{aligned} \tag{3}$$

Where, $V_s$ represents the ripple of the inductor current, and $kC_dR_o$ is a differential constant.

Therefore, in the embodiment, the ripple of the inductor current can be successfully obtained through the VCCS 150. Moreover, according to the above equation, the ripple of the inductor current is less influenced by the ESR $R_{esr}$ of the load capacitor $C_L$.

However, in the current mode buck converting circuit, if a conventional differentiator is used as the feedback unit, a large differential capacitor and resistor has to be used in the differentiator. Moreover, the ripple of the inductor current obtained by the conventional differentiator may have a plurality of undesired noises, which may cause an error in judgement.

Therefore, in the embodiment, the VCCS 150 is used as the differentiator of the voltage converting circuit 100, so that not only a device area of the differentiator can be reduced, but also the inductor current ripple with a low noise can be obtained, and the obtained inductor current ripple is less influenced by the ESR $R_{esr}$.

Further, to reduce a distortion phenomenon of the sensing voltage $V_s$ in the voltage converting circuit 100, in an embodiment of FIG. 3, a quadratic differential and integration (QDI) is used to serve as the second feedback unit.

Figure 3A:
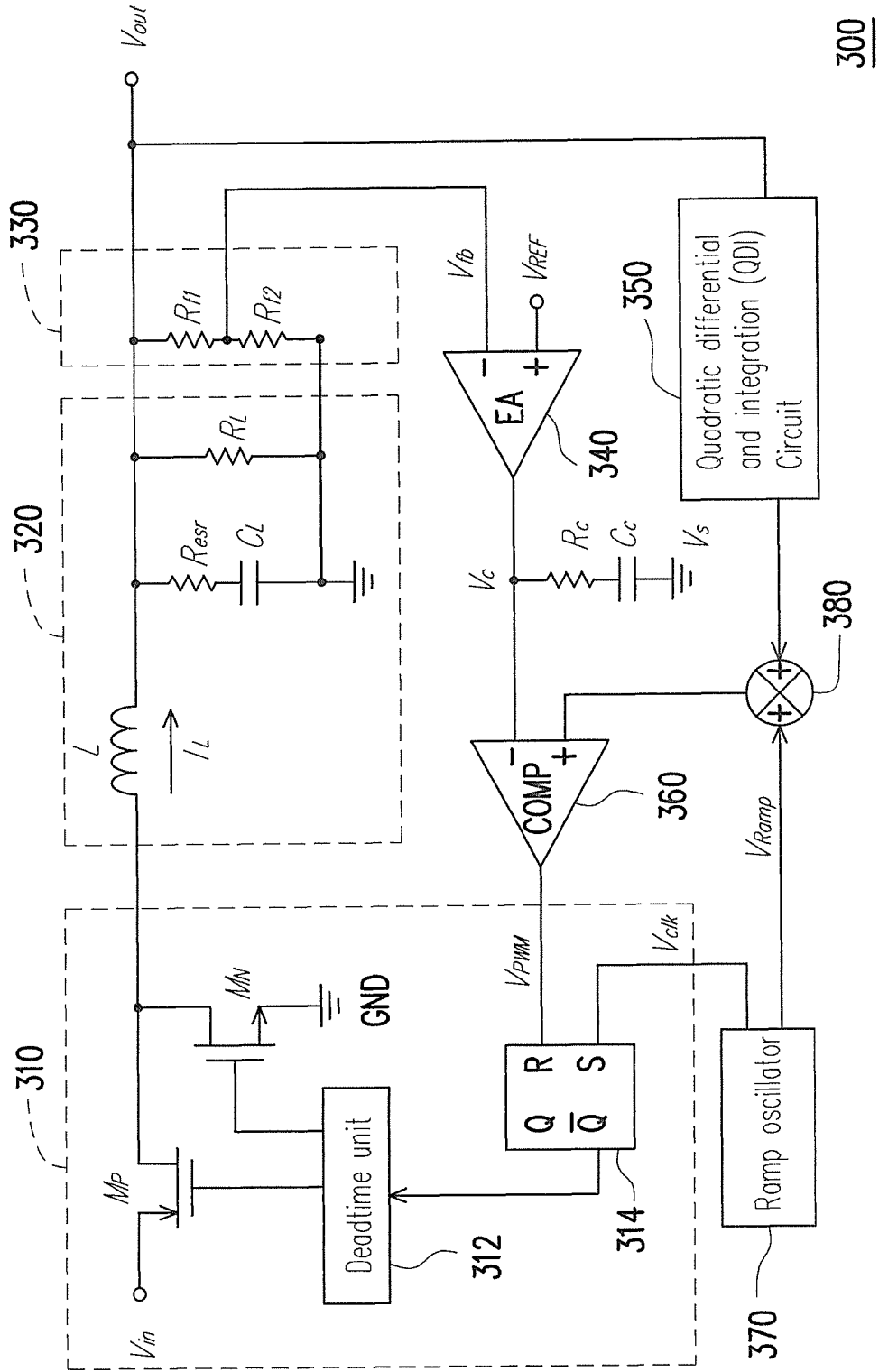
FIG. 3A is a schematic diagram illustrating a voltage converting circuit according to another exemplary embodiment.
Figure 3B:
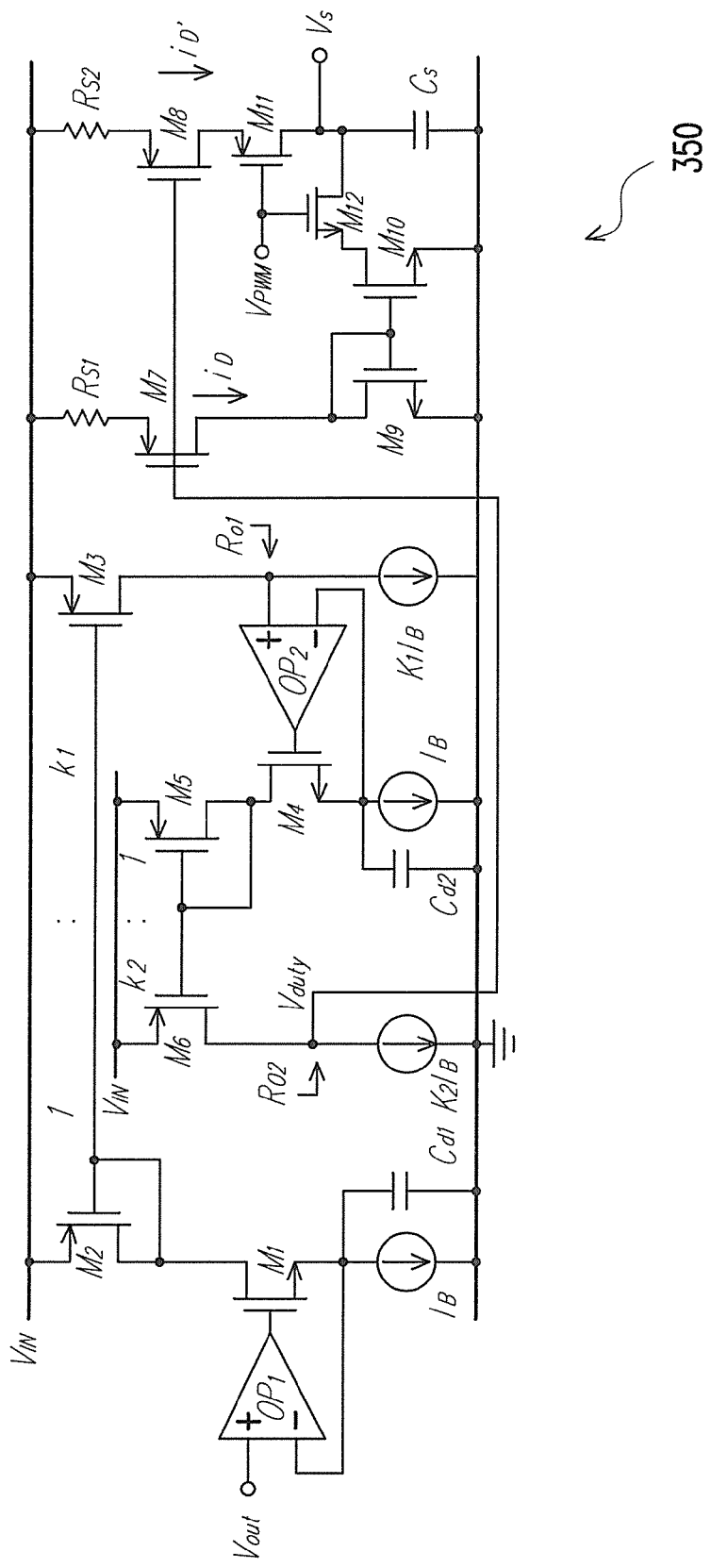
FIG. 3B is a circuit schematic diagram illustrating a quadratic differential and integration (QDI) according to an exemplary embodiment.

FIG. 3A is a schematic diagram illustrating a voltage converting circuit according to another exemplary embodiment. Referring to FIG. 3A, the voltage converting circuit 300 is similar to the voltage converting circuit 100 of FIG. 1, though a main difference there between is that the voltage converting circuit 300 uses the QDI to serve as a second feedback unit 350.

Therefore, after the QDI receives the output voltage $V_{out}$, the QDI performs a quadratic differential operation and an integration operation to the output voltage $V_{out}$ to obtain a sensing voltage $V_s$. Then, after the sensing voltage $V_s$ is added to the ramp compensation voltage $V_{ramp}$, a result thereof is output to a comparator 360. Operation principles of the other parts of the circuit are the same to that of the voltage converting circuit 100 of FIG. 1, and therefore detailed descriptions thereof are not repeated.

In the embodiment, the QDI includes two differentiators and one integrator. Here, the QDI can be implemented by the VCCS 150 of FIG. 2 used as the differentiator and a general integrator, as that shown in FIG. 3B, though the embodiment is not limited thereto.

Therefore, by eliminating the distortion phenomenon caused by the ESR, the sensing voltage $V_s$ generated by the QDI is proportional to the ripple of the inductor current, and a waveform thereof is shown as FIG. 4D.

FIGS. 4A-4D are waveform diagrams of various voltage signals generated when the voltage converting circuit 300 of FIG. 3A uses the QDI to serve as the feedback unit 350. Referring to FIG. 3A and FIGS. 4A-4D, FIG. 4A is a waveform diagram of a ripple of the output voltage $V_{out}$ received by the QDI, which can be represented by the aforementioned equation (1).

Then, the QDI receives the output voltage $V_{out}$, and performs a first differential operation to the output voltage $V_{out}$ to obtain a first differential voltage $V_{df}$, and a waveform thereof is shown as FIG. 4B, and the first differential voltage $V_{df}$ can be represented by a following equation (4):

$$v_{df} = v'_{out} = \tau_1 \left( R_{esr} \frac{V_{in} - V_{out}}{L} + \frac{i_L}{C_L} \right) \quad (4)$$

Then, the QDI performs a second differential operation to the first differential voltage $V_{df}$ to obtain a second differential voltage $V_{duty}$, and a waveform thereof is shown as FIG. 4C, and the second differential voltage $V_{duty}$ can be represented by a following equation (5):

$$v_{duty} = v'_{df} = \tau_1 \tau_2 \left( \frac{1}{C_L} \frac{V_{in} - V_{out}}{L} \right) \quad (5)$$

Then, the QDI performs an integration operation to the second differential voltage $V_{duty}$ to obtain the sensing voltage $V_s$, and a waveform thereof is shown as FIG. 4D, and the sensing voltage $V_s$ can be represented by a following equation (6):

$$v_s = \int v_{duty} dt = \frac{\tau_1 \tau_2}{C_L} i_L + \tau_3 \quad (6)$$

Where, $\tau_1$ and $\tau_2$ are differential and integration constants, and $\tau_3$ is a constant. According to FIG. 4 and the equations (4), (5) and (6), it is known that after two differential operations are performed to the output voltage $V_{out}$, the ESR $R_{esr}$ originally influencing the sensing voltage $V_s$ has been removed.

Therefore, the sensing voltage $V_s$ obtained by the QDI and the ripple of the inductor current are not influenced by the ESR $R_{esr}$. Moreover, by using the QDI, the ripple of the output voltage of the voltage converting circuit is relatively small, and the feature of fast transient response can be achieved.

Figure 5:
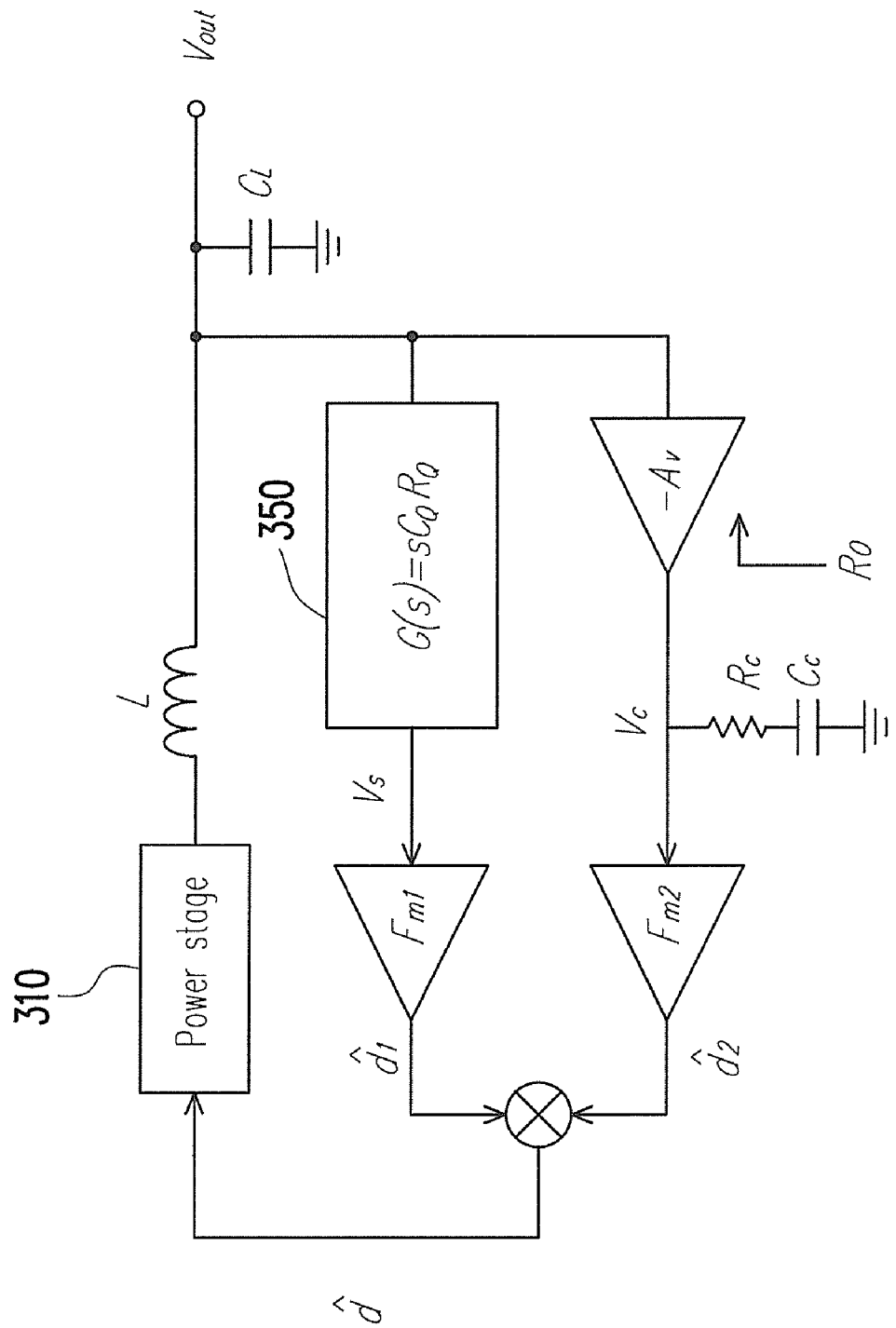
FIG. 5 is an equivalent circuit diagram of a voltage converting circuit of FIG. 3A during a loop analysis.

FIG. 5 is an equivalent circuit diagram of the voltage converting circuit of FIG. 3A during a loop analysis. Referring to FIG. 5, in the embodiment, an inverse of a duty-to-output transfer function is:

$$\frac{\hat{d}}{\hat{v}_{out}} = \hat{d}_1 + \hat{d}_2$$

$$= F_m \left( sC_Q R_Q + A_v \frac{1 + \frac{s}{\omega_z}}{1 + \frac{s}{\omega_p}} \right)$$

$$= A_v F_m \left( \frac{\left(1 + \frac{s}{\omega_{zcom1}}\right)\left(1 + \frac{s}{\omega_{zcom2}}\right)}{1 + \frac{s}{\omega_p}} \right)$$

Where, $$\omega_{zcom1}, \omega_{zcom2} = \frac{A_v R_c}{2 C_Q R_Q R_o} \left( 1 \pm \sqrt{1 - \frac{4 Q_C R_Q R_o}{A_v C_c R_c^2}} \right).$$

Moreover, in the embodiment, a loop transfer function is:

$$T_{QDI} \approx A_v F_m \frac{\left(1 + \frac{s}{\omega_{zcom1}}\right)\left(1 + \frac{s}{\omega_{zcom2}}\right)\left(1 + \frac{s}{\omega_{esr}}\right)}{\left(1 + \frac{2\delta}{\omega_o} s + \frac{1}{\omega_o^2} s^2\right)\left(1 + \frac{s}{\omega_p}\right)\left(1 + \frac{s}{\omega_{ph}}\right)}.$$

Moreover, in the invention, a transfer function of the QDI is:

$$G_{QDI}(s) = \frac{v_s(s)}{v_{out}(s)}$$

$$= \frac{(sk_1 C_{d1} R_{o1})(sk_2 C_{d2} R_{o2})}{sC_s(1/g_m + R_s)}$$

$$= \frac{s}{C_s(1/g_m + R_s)/k_1 k_2 C_{d1} C_{d2} R_{o1} R_{o2}}$$

$$= sC_Q R_Q$$

Where, $$C_Q = \frac{k_1 k_2 C_{d1} C_{d2}}{C_s} \text{ and } R_Q = \frac{R_{o1} R_{o2}}{1/g_m + R_s}.$$

Therefore, in a time-domain, the transfer function of the QDI is:

$$v_s(s) = \frac{1}{s} \cdot \frac{k_1 k_2 C_{d1} C_{d2} R_{o1} R_{o2}}{C_s(1/g_m + R_s)} \cdot s^2 \cdot v_{out}(s) \rightarrow v_s(t)$$

$$= \frac{k_1 k_2 C_{d1} C_{d2} R_{o1} R_{o2}}{C_s(1/g_m + R_s)} \int \left( \frac{d^2}{dt^2} \left( R_{esr} i_L + \frac{1}{C_L} \int i_L dt \right) \right) dt$$

$$\Rightarrow \begin{cases} v_s(t) = \frac{k_1 k_2 C_{d1} C_{d2} R_{o1} R_{o2}}{C_s C_L (1/g_{m8} + R_{s1})} i_L \propto i_L & \text{in } D \\ v_s(t) = \frac{k_1 k_2 C_{d1} C_{d2} R_{o1} R_{o2}}{C_s C_L (1/g_{m7} + R_{s2})} i_L \propto i_L & \text{in } D' \end{cases}$$

Figure 6A:
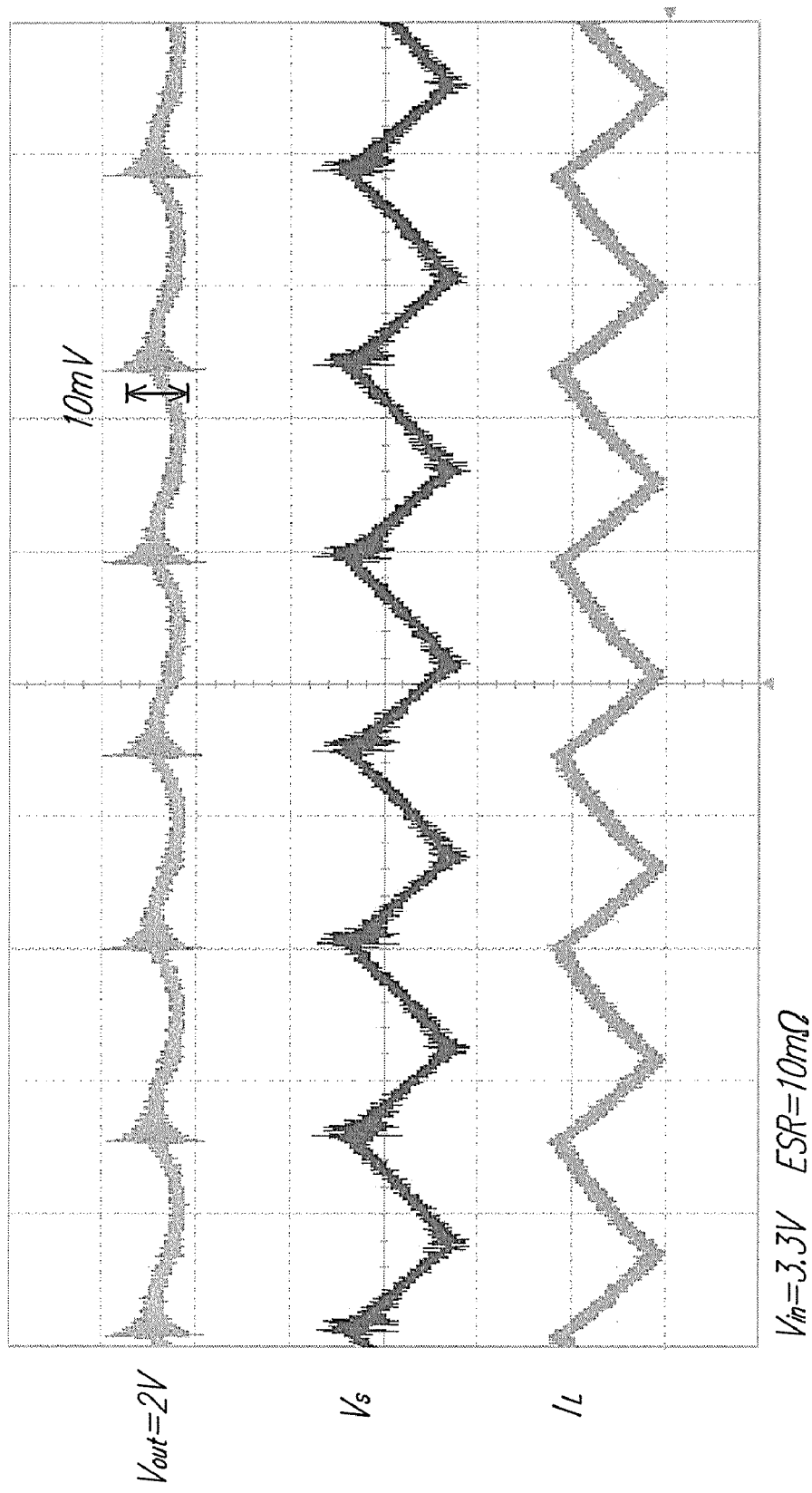
FIG. 6A and FIG. 6B are respectively actual waveform diagrams of various voltage signal of a voltage converting circuit of FIG. 3A that are measured under different parameters.
Figure 6B:
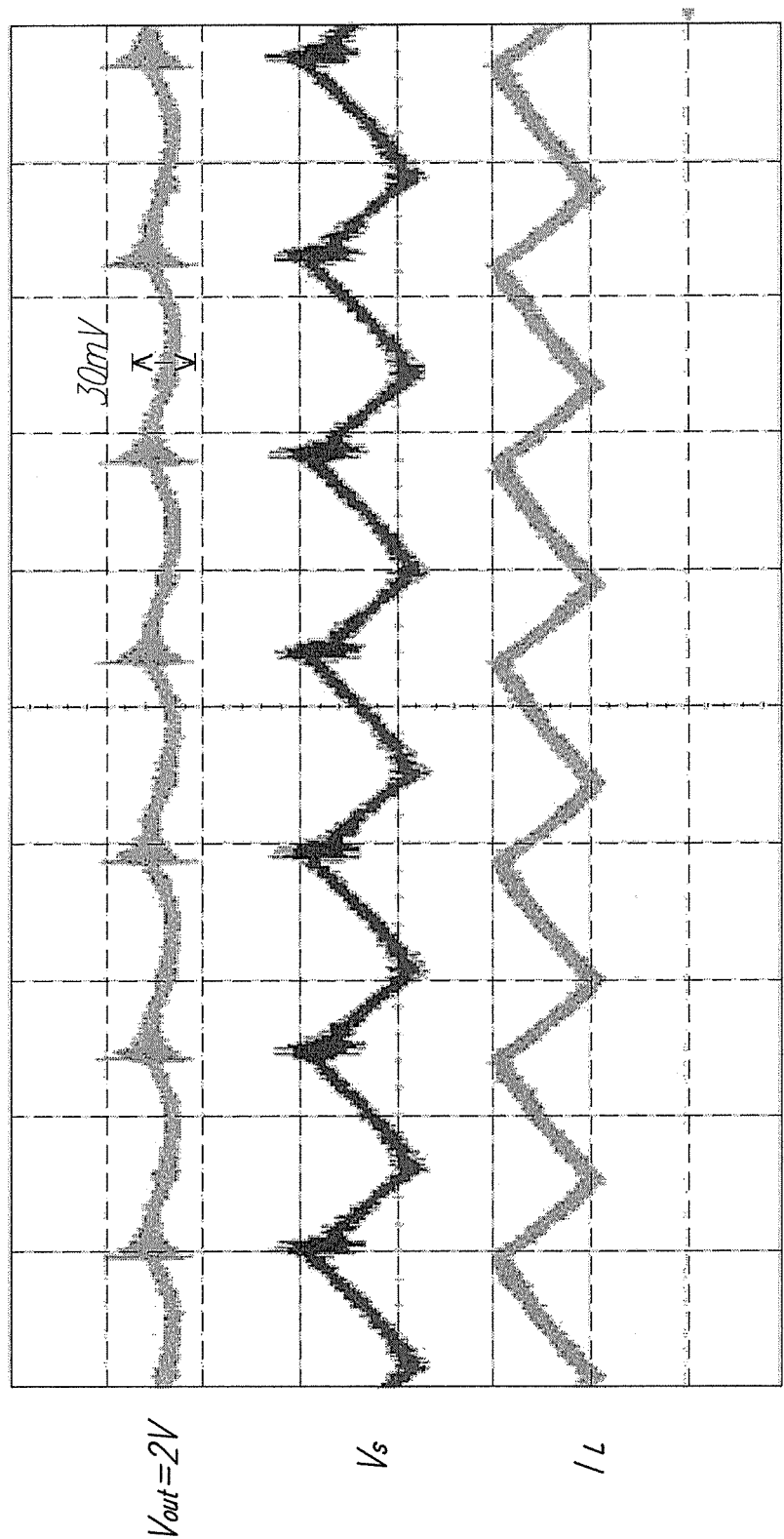

FIG. 6A and FIG. 6B are respectively actual waveform diagrams of various voltage signal of the voltage converting circuit 300 of FIG. 3A that are measured under different parameters.

In FIG. 6A, the input voltage $V_{in}$ is 3.3V, the ESR $R_{esr}$ is 10 m$\Omega$, and the inductor current $I_L$ is 100 mA.

In FIG. 6B, the input voltage $V_{in}$ is 3.3V, the ESR $R_{esr}$ is 30 m$\Omega$, and the inductor current $I_L$ is 300 mA.

According to FIG. 6A and FIG. 6B, it is known that by using the QDI to serve as the feedback unit of the voltage converting circuit 300, the ripple of the inductor current is not influenced by the ESR $R_{esr}$, so that the ripple of the output voltage can be reduced, and thus the output voltage can be more precise.

FIGS. 7A, 7B, 8A and 8B are respectively actual waveform diagrams of the output voltage of the voltage converting circuit 300 of FIG. 3A that are measured when the load is varied.

Figure 7A:
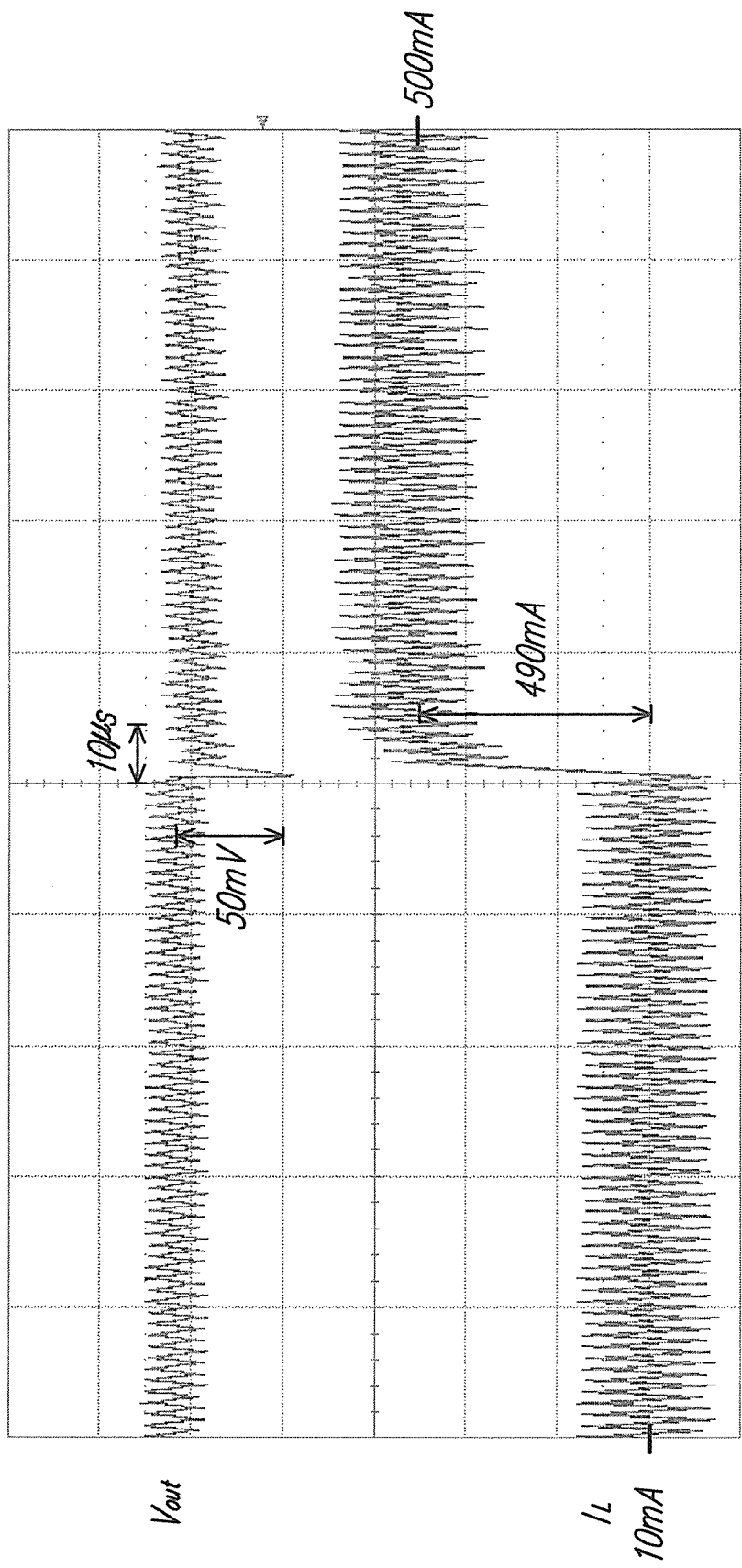
FIGS. 7A, 7B, 8A and 8B are respectively actual waveform diagrams of an output voltage of a voltage converting circuit of FIG. 3A that are measured when a load is varied.

In FIG. 7A, the ESR $R_{esr}$ is 30 m$\Omega$, and the inductor current is quickly switched from 10 mA to 500 mA.

Figure 7B:
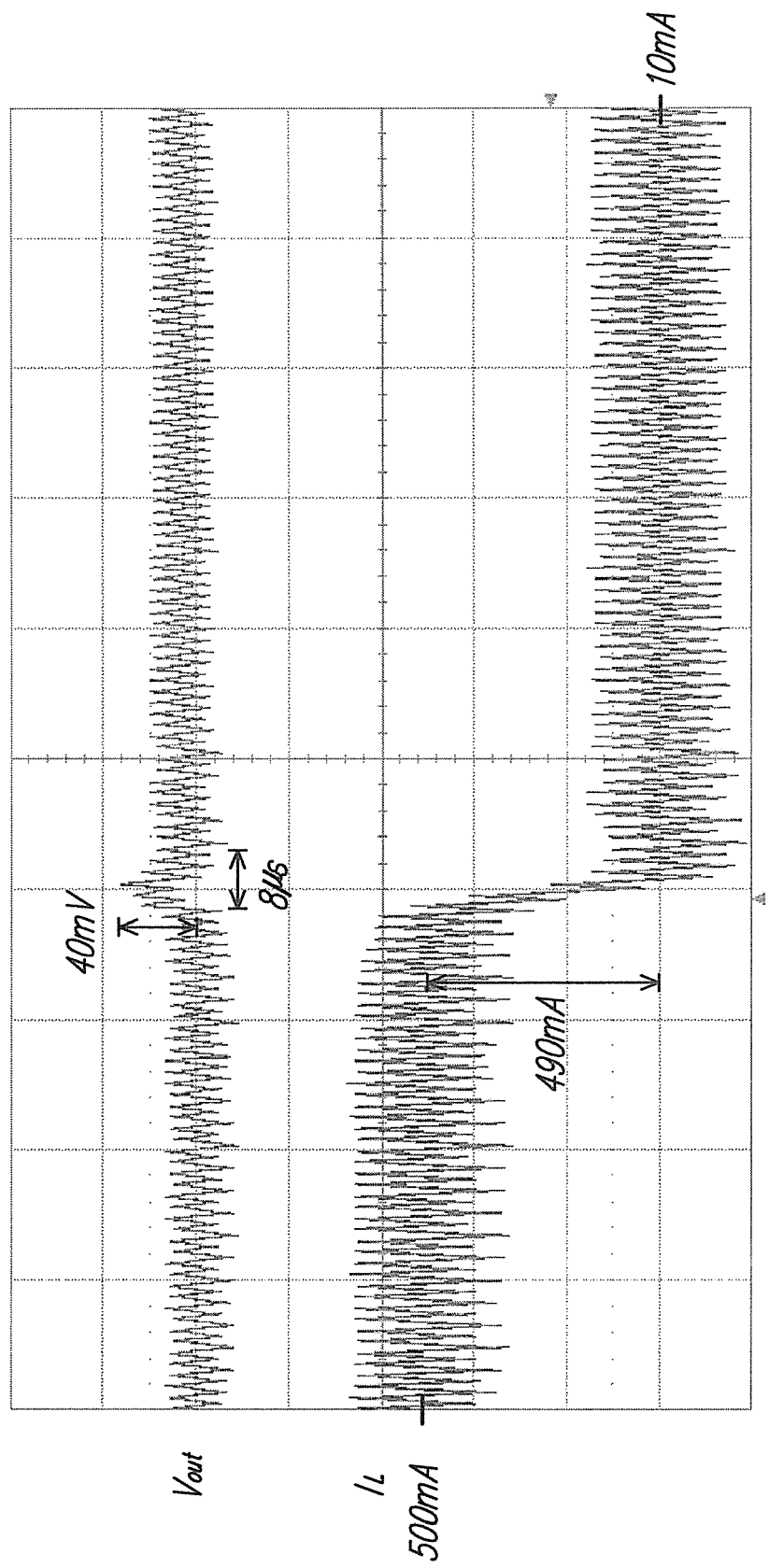

In FIG. 7B, the ESR $R_{esr}$ is 30 m$\Omega$, and the inductor current is quickly switched from 500 mA to 10 mA.

Figure 8A:
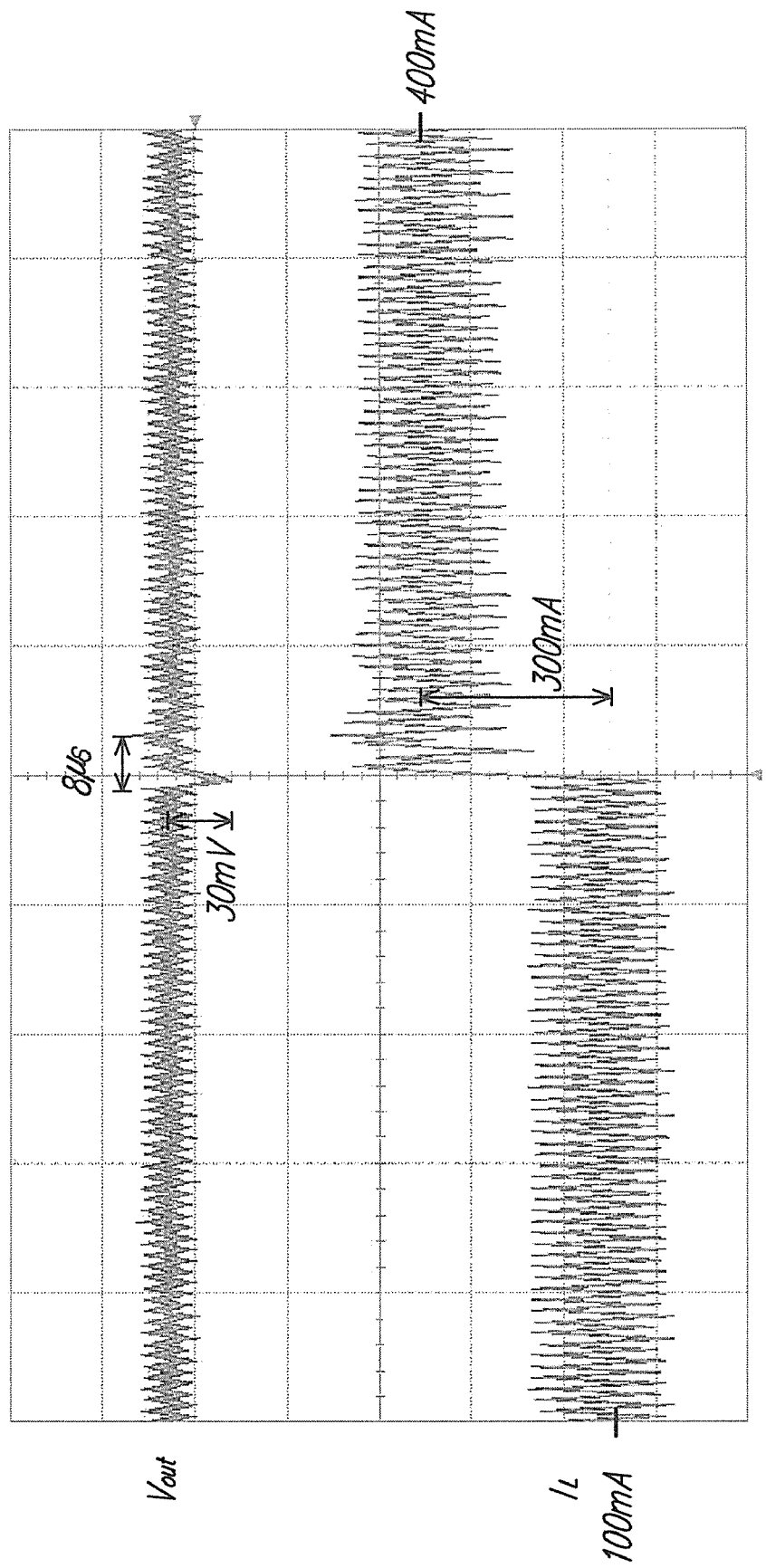

In FIG. 8A, the ESR $R_{esr}$ is 10 m$\Omega$, and the inductor current is quickly switched from 10 mA to 400 mA.

Figure 8B:
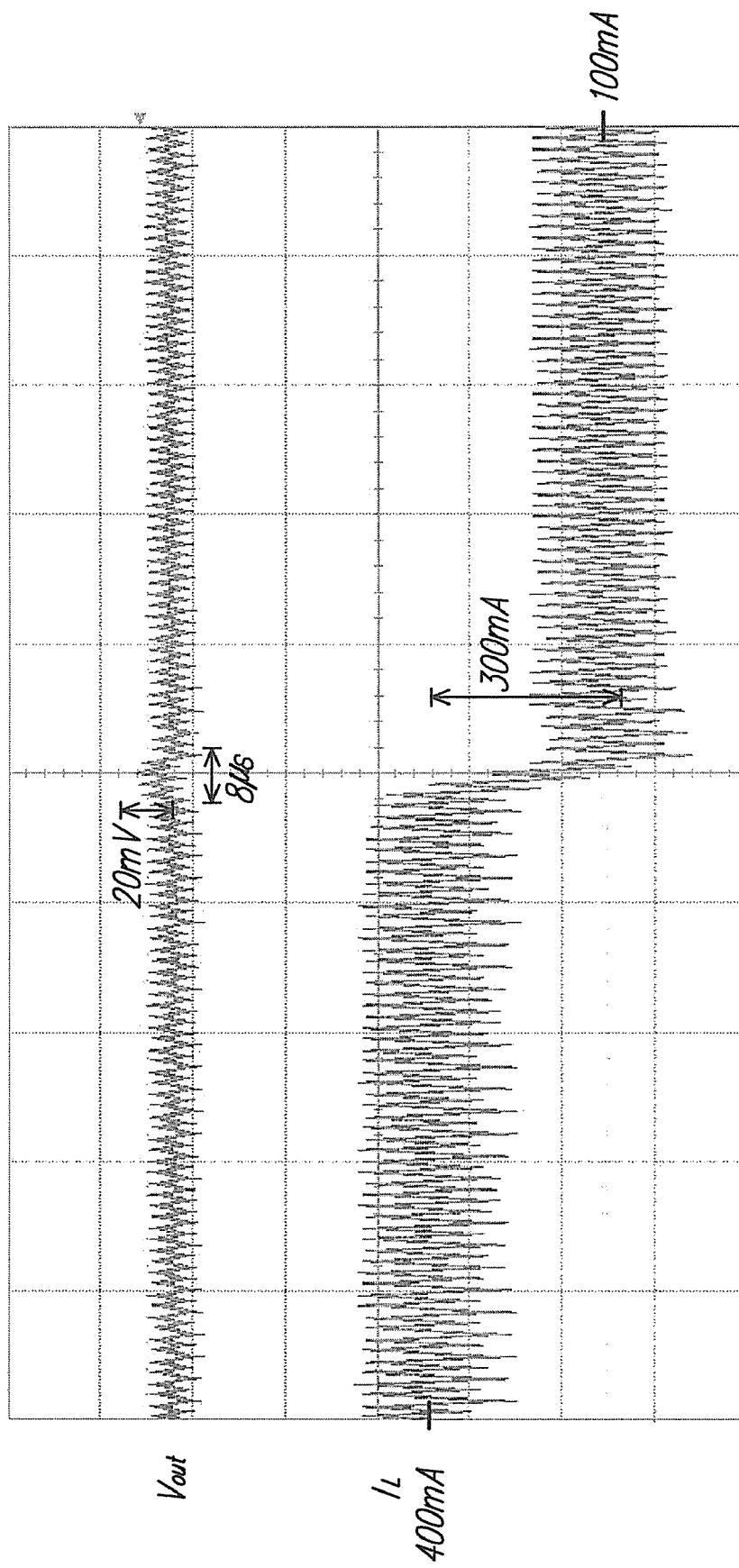

In FIG. 8B, the ESR $R_{esr}$ is 10 m$\Omega$, and the inductor current is quickly switched from 400 mA to 10 mA.

According to the above diagrams, it is known the QDI is used as the feedback unit of the voltage converting circuit 300, and in case of the low ESR $R_{esr}$, the ripple of the output voltage is relatively small, and the feature of fast transient response is achieved, so that an overshoot and an undershoot phenomenon generated due to a load variation can be mitigated, and a voltage recovery time can be reduced.

Figure 9:
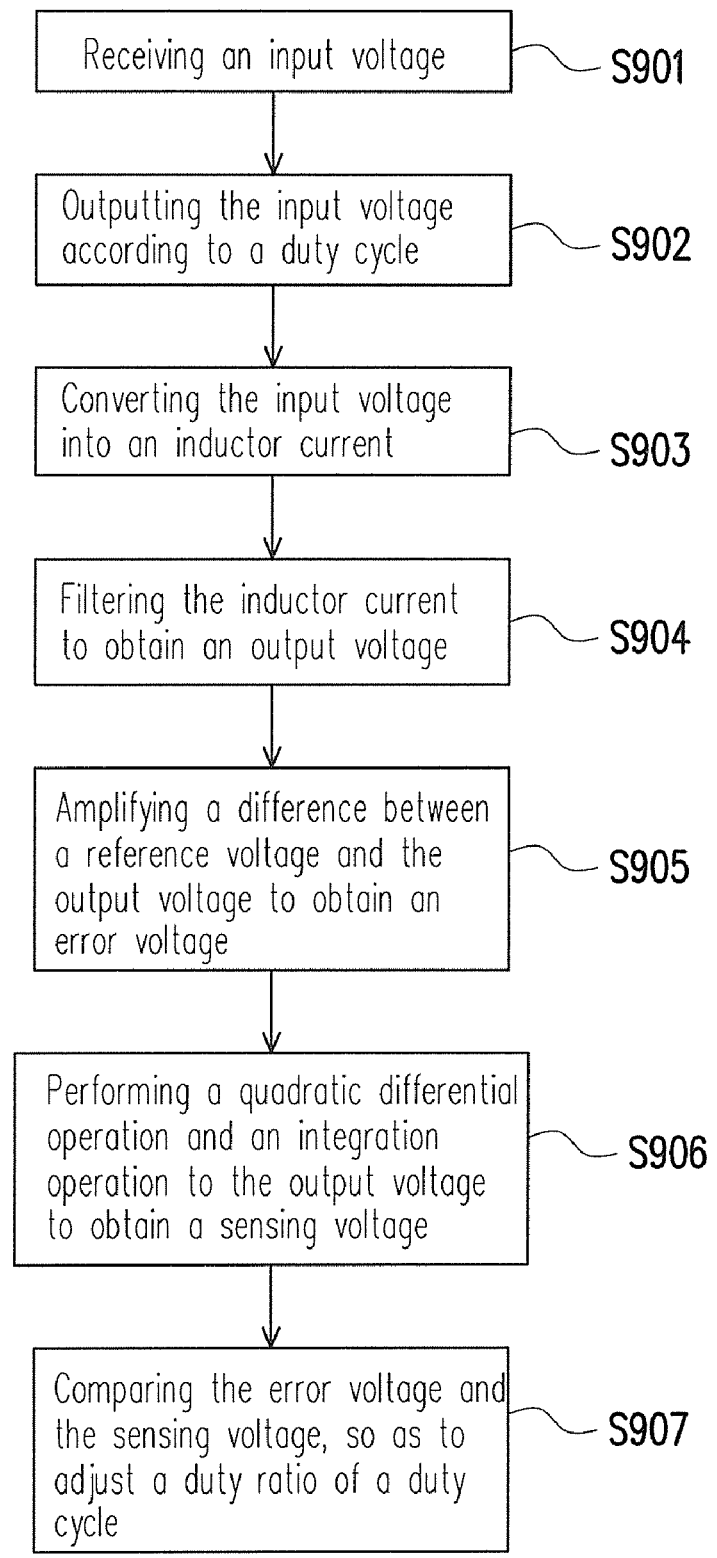
FIG. 9 is a flowchart illustrating a voltage conversion method according to an exemplary embodiment.

FIG. 9 is a flowchart illustrating a voltage conversion method according to an exemplary embodiment. Referring to FIG. 9, the voltage conversion method of the present embodiment is adapted to the voltage converting circuit of FIG. 1 or FIG. 3A, though the embodiment is not limited thereto.

The voltage conversion method can be described as follows. First, in step S901, an input voltage is received, and in step S902, the input voltage is output according to a duty cycle. The input voltage is converted into an inductor current through the POWERMOS according to the duty cycle. Next, in step S903, the input voltage is converted into an inductor current. Next, in step S904, the inductor current is filtered to obtain an output voltage, and in step S905, a difference between a reference voltage and the output voltage is amplified to obtain an error voltage. The inductor current is filtered by the output stage to obtain an output voltage. A difference between a reference voltage and the output voltage is amplified to obtain an error voltage. Next, in step S906, a quadratic differential operation and an integration operation are performed to the output voltage to obtain a sensing voltage. Next, in step S907, the error voltage and the sensing voltage are compared, so as to adjust a duty ratio of the duty cycle. Herein, a ripple of the output voltage is linearly proportional to a ripple of the current, and a DC divided voltage level of the output voltage is substantially equal to the reference voltage.

In other one of exemplary embodiments, the voltage conversion method further includes generating a ramp compensation voltage, and before the step of comparing the error voltage and the sensing voltage, the sensing voltage is added to the ramp compensation voltage. Moreover, in the step of amplifying the difference between the reference voltage and the output voltage, a difference between the reference voltage and a voltage-divided output voltage can be amplified.

Therefore, those with ordinary skill in the art can learn the spirit of the present invention according to the descriptions of the embodiments of FIGS. 1-3B.

In summary, in at least one of the exemplary embodiments, the VCCS is used to serve as the differentiator of the voltage converting circuit, so that not only a device area of the differentiator can be reduced, but also the inductor current ripple with a low noise can be obtained, and the obtained inductor current ripple is less influenced by the ESR $R_{esr}$. Therefore, the voltage converting circuit may have a feature of low output voltage ripple without using a large ESR, and meanwhile a feature of fast transient response of a $V^2$ control buck converter is maintained. Further, in at least one of the exemplary embodiments, by using the QDI to serve as the feedback unit of the voltage converting circuit, the sensing voltage $V_s$ generated by the QDI is proportional to the ripple of the inductor current, and the ripple of the inductor current of the voltage converting circuit is not influenced by the ESR $R_{esr}$, so that the ripple of the output voltage can be reduced, and thus the output voltage can be more precise.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage converting circuit, comprising:
   a power stage, receiving an input voltage, and outputting the input voltage according to a duty cycle in internal of the power stage;
   a filter, receiving the input voltage output from the power stage to convert the input voltage into a current, and filtering the current to obtain an output voltage;
   a first feedback unit, receiving a reference voltage and the output voltage, and amplifying a difference between the reference voltage and the output voltage to obtain an error voltage;
   a second feedback unit, receiving the output voltage, and performing a quadratic differential operation and an integration operation to the output voltage to obtain a sensing voltage; and
   a comparator, comparing the error voltage and the sensing voltage, and outputting a comparing result to the power stage, so as to adjust a duty ratio of the duty cycle,
   wherein a ripple of the output voltage is linearly proportional to a ripple of the current, and a direct current (DC) divided voltage level of the output voltage is substantially equal to the reference voltage.

2. The voltage converting circuit as claimed in claim 1, wherein the second feedback unit comprises a first differentiator, a second differentiator and an integrator.

3. The voltage converting circuit as claimed in claim 2, wherein the first differentiator and the second differentiator are respectively a voltage control current source.

4. The voltage converting circuit as claimed in claim 3, wherein the voltage control current source comprises:
   a current mirror, serving as a current source of the voltage control current source;
   a first capacitor, having a first terminal and a second terminal, and the second terminal being coupled to a ground voltage;
   an operational amplifier, having a first input terminal, a second input terminal and an output terminal, the first input terminal receiving the output voltage, and the second input terminal being coupled to the first terminal of the first capacitor; and
   a first switch, coupled to the current mirror and the operational amplifier, and having a first terminal, a second terminal and a control terminal,
   wherein the output terminal of the operational amplifier is coupled to the control terminal of the first switch for turning on/off the first switch, so as to control the current mirror.

5. The voltage converting circuit as claimed in claim 1, further comprising a ramp oscillator for generating a ramp compensation voltage and a clock signal, wherein after the sensing voltage output by the second feedback unit is added to the ramp compensation voltage, an adding result is output to the comparator, and the ramp oscillator outputs the clock signal to the power stage.

6. The voltage converting circuit as claimed in claim 1, wherein the first feedback unit is an error amplifier having a first input terminal, a second input terminal and an output terminal, the first input terminal receives the reference voltage, the second input terminal receives the output voltage, the error amplifier amplifies the difference between the reference voltage and the output voltage to obtain the error voltage, and the output terminal outputs the error voltage to the comparator.

7. The voltage converting circuit as claimed in claim 6, further comprising a voltage divider for dividing the output voltage and outputting the divided output voltage to the second input terminal of the error amplifier.

8. The voltage converting circuit as claimed in claim 7, wherein the voltage divider comprises:
  a first resistor, having a first terminal and a second terminal, the first terminal receiving the output voltage, and the second terminal outputting the divided output voltage to the second input terminal of the error amplifier; and
  a second resistor, having a first terminal and a second terminal, the first terminal being coupled to the second terminal of the first resistor, and the second terminal being coupled to a ground voltage.

9. The voltage converting circuit as claimed in claim 1, wherein the filter is a low pass filter, and the filter comprises:
  an inductor, having a first terminal and a second terminal, the first terminal receiving the input voltage for converting the input voltage into the current, and the second terminal outputting the output voltage;
  a second capacitor, having a first terminal and a second terminal, the first terminal being coupled to the second terminal of the inductor, and the second terminal being coupled to a ground voltage; and
  a third resistor, having a first terminal and a second terminal, the first terminal being coupled to the second terminal of the inductor, and the second terminal being coupled to the ground voltage.

10. The voltage converting circuit as claimed in claim 1, wherein the power stage comprises:
  a second switch, coupled to the input voltage, and outputting the input voltage to the filter when the second switch is turned on;
  a third switch, coupled to a ground voltage, and outputting the ground voltage to the filter when the third switch is turned on;
  a deadtime unit, receiving the duty cycle, for turning on/off the second switch and the third switch; and
  a logic unit, generating and outputting the duty cycle to the deadtime unit, and adjusting the duty ratio of the duty cycle according to the comparing result and a clock signal.

11. The voltage converting circuit as claimed in claim 10, wherein the second switch is a P-type metal oxide semiconductor field-effect transistor (PMOSFET), and the third switch is a N-type metal oxide semiconductor field-effect transistor (NMOSFET).

12. The voltage converting circuit as claimed in claim 10, wherein when the second switch is turned on, the third switch is turned off, and when the third switch is turned on, the second switch is turned off.

13. The voltage converting circuit as claimed in claim 10, wherein the comparing result output by the comparator is a pulse width modulation voltage.

14. The voltage converting circuit as claimed in claim 10, wherein the logic unit is a SR-type flip-flop.

15. The voltage converting circuit as claimed in claim 14, wherein a set terminal of the SR-type flip-flop receives a clock signal, and a reset terminal of the SR-type flip-flop receives the comparing result.

16. A voltage conversion method, adapted to a voltage converting circuit, comprising:
  receiving an input voltage;
  outputting the input voltage according to a duty cycle;
  converting the input voltage into a current;
  filtering the current to obtain an output voltage;
  amplifying a difference between a reference voltage and the output voltage to obtain an error voltage;
  performing a quadratic differential operation and an integration operation to the output voltage to obtain a sensing voltage; and
  comparing the error voltage and the sensing voltage, so as to adjust a duty ratio of the duty cycle,
  wherein a ripple of the output voltage is linearly proportional to a ripple of the current, and a DC divided voltage level of the output voltage is substantially equal to the reference voltage.

17. The voltage conversion method as claimed in claim 16, further comprising generating a ramp compensation voltage, wherein before the step of comparing the error voltage and the sensing voltage, the sensing voltage is added to the ramp compensation voltage.

18. The voltage conversion method as claimed in claim 16, wherein the step of amplifying the difference between the reference voltage and the output voltage comprises amplifying a difference between the reference voltage and a voltage-divided output voltage.

19. A voltage converting circuit, comprising:
  a power stage, receiving an input voltage, and outputting the input voltage according to a duty cycle in internal of the power stage;
  a filter, receiving the input voltage output from the power stage to convert the input voltage into a current, and filtering the current to obtain an output voltage;
  a first feedback unit, receiving a reference voltage and the output voltage, and amplifying a difference between the reference voltage and the output voltage to obtain an error voltage;
  a second feedback unit, receiving the output voltage, and performing a differential operation to the output voltage to obtain a sensing voltage, wherein the second feedback unit is a voltage control current source; and
  a comparator, comparing the error voltage and the sensing voltage, and outputting a comparing result to the power stage, so as to adjust a duty ratio of the duty cycle,
  wherein a ripple of the output voltage is linearly proportional to a ripple of the current, and a DC divided voltage level of the output voltage is substantially equal to the reference voltage.

20. The voltage converting circuit as claimed in claim 19, wherein the voltage control current source comprises:
  a current mirror, serving as a current source of the voltage control current source;
  a first capacitor, having a first terminal and a second terminal, and the second terminal being coupled to a ground voltage;
  an operational amplifier, having a first input terminal, a second input terminal and an output terminal, the first input terminal receiving the output voltage, and the second input terminal being coupled to the first terminal of the first capacitor; and
  a first switch, coupled to the current mirror and the operational amplifier, and having a first terminal, a second terminal and a control terminal,
  wherein the output terminal of the operational amplifier is coupled to the control terminal of the first switch for turning on/off the first switch, so as to control the current mirror.

21. The voltage converting circuit as claimed in claim 19, further comprising a ramp oscillator for generating a ramp compensation voltage and a clock signal, wherein after the sensing voltage output by the second feedback unit is added to the ramp compensation voltage, an adding result is output to the comparator, and the ramp oscillator outputs the clock signal to the power stage.

22. The voltage converting circuit as claimed in claim 19, wherein the first feedback unit is an error amplifier having a first input terminal, a second input terminal and an output terminal, the first input terminal receives the reference voltage, the second input terminal receives the output voltage, the error amplifier amplifies the difference between the reference voltage and the output voltage to obtain the error voltage, and the output terminal outputs the error voltage to the comparator.

23. The voltage converting circuit as claimed in claim 22, further comprising a voltage divider for dividing the output voltage and outputting the divided output voltage to the second input terminal of the error amplifier.

24. The voltage converting circuit as claimed in claim 23, wherein the voltage divider comprises:
a first resistor, having a first terminal and a second terminal, the first terminal receiving the output voltage, and the second terminal outputting the divided output voltage to the second input terminal of the error amplifier; and
a second resistor, having a first terminal and a second terminal, the first terminal being coupled to the second terminal of the first resistor, and the second terminal being coupled to a ground voltage.

25. The voltage converting circuit as claimed in claim 19, wherein the filter is a low pass filter, and the filter comprises:
an inductor, having a first terminal and a second terminal, the first terminal receiving the input voltage for converting the input voltage into the current, and the second terminal outputting the output voltage;
a second capacitor, having a first terminal and a second terminal, the first terminal being coupled to the second terminal of the inductor, and the second terminal being coupled to a ground voltage; and
a third resistor, having a first terminal and a second terminal, the first terminal being coupled to the second terminal of the inductor, and the second terminal being coupled to the ground voltage.

26. The voltage converting circuit as claimed in claim 19, wherein the power stage comprises:
a second switch, coupled to the input voltage, and outputting the input voltage to the filter when the second switch is turned on;
a third switch, coupled to a ground voltage, and outputting the ground voltage to the filter when the third switch is turned on;
a deadtime unit, receiving the duty cycle, for turning on/off the second switch and the third switch; and
a logic unit, generating and outputting the duty cycle to the deadtime unit, and adjusting the duty ratio of the duty cycle according to the comparing result and a clock signal.

27. The voltage converting circuit as claimed in claim 26, wherein the second switch is a P-type metal oxide semiconductor field-effect transistor (PMOSFET), and the third switch is a N-type metal oxide semiconductor field-effect transistor (NMOSFET).

28. The voltage converting circuit as claimed in claim 26, wherein when the second switch is turned on, the third switch is turned off, and when the third switch is turned on, the second switch is turned off.

29. The voltage converting circuit as claimed in claim 26, wherein the comparing result output by the comparator is a pulse width modulation voltage.

30. The voltage converting circuit as claimed in claim 26, wherein the logic unit is a SR-type flip-flop.

31. The voltage converting circuit as claimed in claim 30, wherein a set terminal of the SR-type flip-flop receives a clock signal, and a reset terminal of the SR-type flip-flop receives the comparing result.

* * * * *